Nov. 10, 1925.
B. B. WELLS
1,560,956
SIGNAL SWITCH DEVICE FOR STEERING WHEELS
Filed Sept. 27, 1921
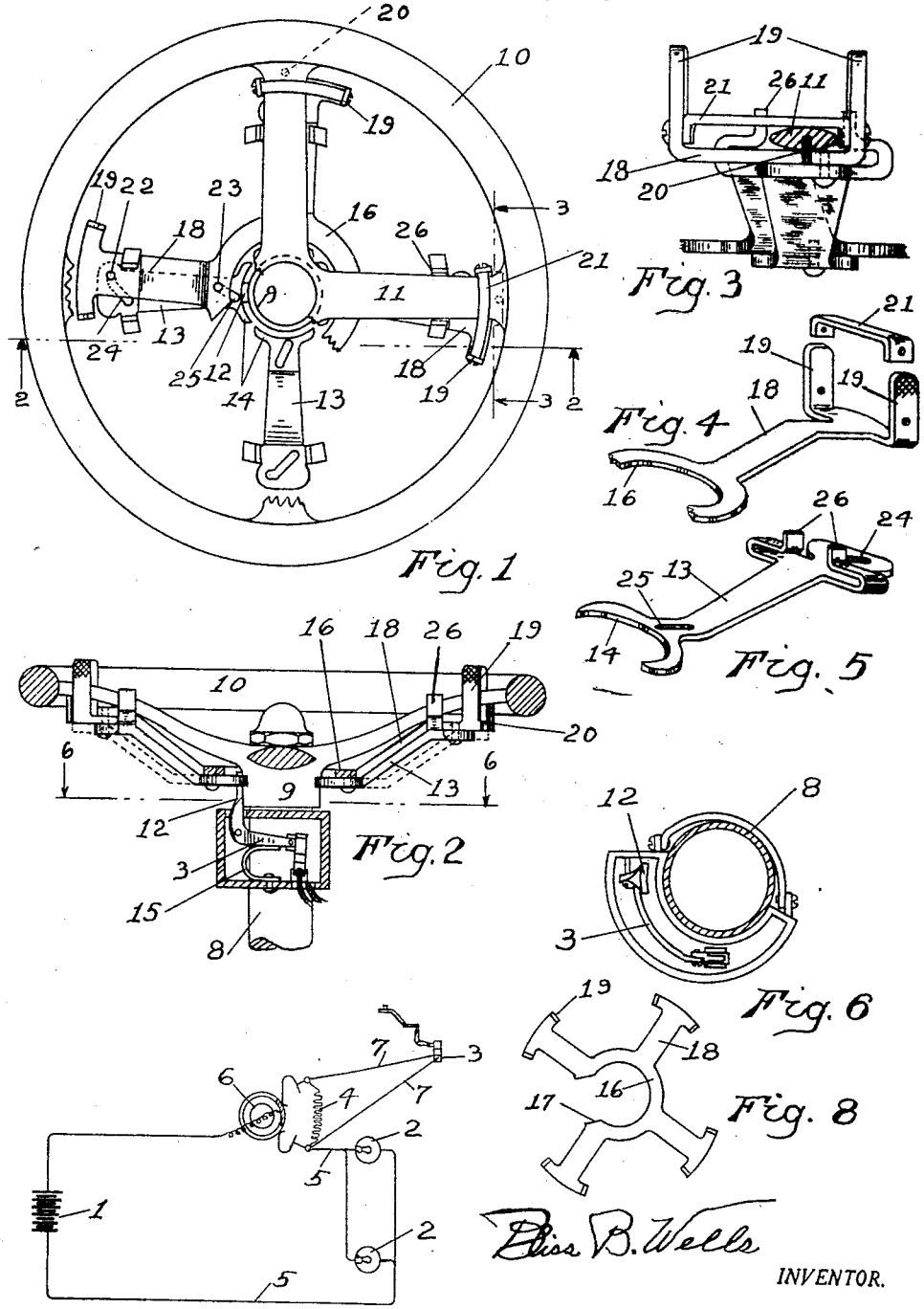

Patented Nov. 10, 1925.

1,560,956

UNITED STATES PATENT OFFICE.

BLISS B. WELLS, OF SAGINAW, MICHIGAN, ASSIGNOR OF ONE-HALF TO HERBERT C. REMER, OF SAGINAW, MICHIGAN.

SIGNAL SWITCH DEVICE FOR STEERING WHEELS.

Application filed September 27, 1921. Serial No. 503,512.

*To all whom it may concern:*

Be it known that I, BLISS B. WELLS, a citizen of the United States, residing at Saginaw, in the county of Saginaw and State of Michigan, have invented certain new and useful Improvements in Signal Switch Devices for Steering Wheels; and I do hereby declare the following to be a full, clear, and exact description of the invention, such as will enable others skilled in the art to which it appertains to make and use the same.

This invention relates to signal systems and the like and pertains more particularly to an improved system for controlling the headlights and dimmers such as are commonly employed on automobiles and other vehicles.

The objects of my improvement are, to provide in combination with the headlight dimmer system of an automobile or other vehicle, an actuating means for said system whereby the driver of the vehicle may have under his immediate control means for dimming the headlights or increasing their brilliancy as may be desired, without materially changing the position of his hands on the driving wheel and without distracting his attention from the road ahead.

A further object is to provide a means whereby the dimming and headlight circuits are controlled from the steering wheel in such a manner that the controlling-switch actuating mechanism will be in close proximity to the driver's hands regardless of any position to which the steering wheel may be turned in the course of driving.

The driving of a motor vehicle on country roads at night requires frequent use of the dimming and bright light circuits. At the time when the driver's attention is most needed, namely, at the time of turning out to pass a vehicle, or under similar circumstances, he needs perfect control of the steering wheel and he can only keep this control by retaining his hands in their proper driving position. But since the steering wheel may at any given time be turned into any one of its rotated positions, it is necessary, in order that the driver may operate the lights without moving his hands, to have the light-control switch within easy reach. He then need not shift the position of his hands to operate the lights.

My improvement, therefore, comprises a make-and-break switch-actuating mechanism, and hand-operated devices located at various points around the rim of the steering wheel, so that in whatever rotated position the wheel may be found, the driver may always operate the switch without changing the position of his hands on the wheel.

With the foregoing and certain other objects in view, which will appear later in the specification, my invention comprises the devices described and claimed and the equivalents thereof.

In the drawings, Fig. 1 is a top plan view, broken away in part, showing a steering wheel with my switch-actuating mechanism in place.

Fig. 2 is a vertical section on line 2—2 of Fig. 1.

Fig. 3 is an enlarged sectional detail on the line 3—3 of Fig. 1.

Fig. 4 is a perspective view, partly broken away, showing one of the switch actuating levers.

Fig. 5 is a perspective view of the switch actuating shuttle bar.

Fig. 6 is an enlarged section on line 6—6 of Fig. 2.

Fig. 7 is a diagrammatic view of one of the usual arrangements of the light-dimming circuit of a motor vehicle.

Fig. 8 is the spider or frame carrying the switch-actuating devices.

In the drawings I have illustrated a preferred form and arrangement of devices whereby I accomplish the object of my invention, which as above stated, is primarily to provide a means whereby switch-operating devices may be located at and operated from various points around the rim of the steering wheel.

There are numerous systems of light-wiring commonly employed in motor vehicles. My improvement is adapted to be applied to any of these systems, it being only necessary to operatively connect the wiring system with a make-and-break switch of any suitable construction so that opening or closing the switch will produce the desired effect of brilliancy or dimming.

One of the common systems of wiring is illustrated diagrammatically in Fig. 7, and for purpose of description I will refer to that figure as an illustration of one wiring arrangement by which the switch may be connected with the lights. In this arrangement, 1 is the source of current, 2 the lights and 3 the make-and-break switch, the operating mechanism of which constitutes my present invention. 5 is the light circuit in which lights 2 are connected.

6 is a control switch of usual construction, whereby the current from the battery 1, or from any other source, is sent through the lights 2, either directly or through a resistance 4, as desired. When the current passes through resistance 4 the lights are dimmed and when it passes through circuit 5 the lights are bright.

The terminals of resistance 4 are connected to the terminals of the make-and-break switch 3 by wires 7, so that when switch 3 is open the current from battery 1 passes through resistance 4 and the lights are dimmed. When the switch 3 is closed nearly the full current passes through circuit 7, through switch 3 and thence to the lights 2 for maximum light.

The foregoing is merely one of numerous circuit arrangements that are or may be applied to lighting systems to which my invention is applicable. I have illustrated this one lighting system as an example, but it will be understood that my invention may be applied to any other lighting system which can be controlled by the opening and closing of a make-and-break-switch of any suitable or desirable construction.

The switch 3, or its equivalent, is in my present invention preferably located in proximity to or on the steering column jacket 8 near the hub 9 of the steering wheel 10.

11 are the usual arms of the steering wheel and it is upon these arms that I prefer to mount the mechanism by which switch 3 is actuated.

In practice I prefer to apply to each arm a movable switch-actuating device, whereby the switch 3 may be opened or closed by the pressure of a finger. By supplying a plurality of these switch-actuating devices, located around the rim of the wheel and preferably upon each of the spokes 11, the driver is enabled to actuate the switch 3 without materially changing the position of his hand on the steering wheel, regardless of what rotated position the steering wheel may be in.

The scope of my invention, as set forth in the claims, is not limited to the specific construction and arrangement of switch-actuating devices illustrated in the drawings, but it will be understood that various modifications within the scope of the claims, both in construction and mode of operation may be employed without departing from my invention. In practice, however, I prefer the construction illustrated in the drawings.

Referring now to Figs. 1 and 2, I provide on the switch 3 an upwardly projecting lever 12, which by being moved radially inward toward the hub 9, or outwardly therefrom, will properly actuate the switch 3 to make or break the circuit, as the case may be.

To move the lever 12 toward or from the hub 9, regardless of the revolved position of the wheel 10, I provide underneath each of the arms 11 a longitudinally movable shuttle bar 13 having a curved end 14 of concave or similar form, as shown in Fig. 5. There are preferably as many of these shuttle bars 13 as there are arms 11 on the wheel and the concave end 14 of each bar includes such a part of the circumference of a circle as will enable all of the arms when closed around the hub 9 to include a complete circle, as will be more fully set forth.

When one of the shuttle bars 11 is pushed inwardly toward the hub 9 if it happens to be opposite lever 12 of switch 3, it pushes lever 12 inwardly and opens or closes the switch, as the case may be. The switch may be automatically returned to its normal position by a spring 15, or its equivalent, when the inward pressure on bar 13 is released. The bar 13 is preferably carried by a spider or frame comprising, as shown in Fig. 8, an annular ring 16, preferably apertured as at 17 to enable the ring to be assembled on the hub 9 by slipping it onto the column jacket 8 and then raising it to the position shown at 16 in Fig. 2.

A plurality of radial arms 18 are carried by ring 16 and are preferably integral therewith. At the end of each arm 18 is a pair of outwardly and upwardly extending lugs 19 embracing between them the arm 11, but spaced far enough apart to permit a limited degree of angular movement of arm 18 with respect to arm 11 of the wheel. To maintain the spider, consisting of the ring 16, its arms 18 and lugs 19, in proper centered relation with the steering wheel, a downwardly projecting pin, or its equivalent, 20 is provided on each of the spokes 11, these pins engaging the circular outer ends of arms 18.

Each pair of lugs 19 is provided with a cross strap, or bar 21, and the spoke, as 11, is received between the strap 21 and the end of arm 18, as shown in Figs. 1 to 4 inclusive.

Each of the arms 18 has a downwardly projecting pin or rivet 22 located near its outer end, and a similar pin 23 located near its inner end.

Upon these two pins, each shuttle bar 13 is slidingly mounted, the pins 22 and 23 being slidingly received in the slots 24 and 25 respectively. These slots are diagonally disposed as shown in Fig. 1, so that when any one of the lugs 19 is moved, all the other radial arms 18 move to the right or left. All the shuttle bars 13 move simultaneously inwardly or outwardly, as the case may be, and their inner curved ends 14 in effect produce a contracting or expanding annular ring that surrounds the hub 9 and the end of lever 12, to actuate the lever and thereby close or open the switch 3. Shuttle bars 13 are guided on the wheel arms 11 by guide lugs 26, which slidingly engage the side edges of wheel rims 11, preventing sidewise movement of the outer end of the shuttle bar.

The switch 3 controls the current to the lights 2 to permit them to burn either dimly or brilliantly, as desired, the particular arrangement of the circuit and the arrangement of the contact end of switch 3 being adapted in each case to the type or mode of operation of the lighting system of which there are a number of kinds in use.

While I have shown and described a specific arrangement and combination of parts whereby the switch 3 is operated by moving any one of the sets of lugs 19 located around the wheel rim, yet it will be understood that any other equivalent mechanism may be employed, whereby a plurality of any suitable hand-operated devices, equivalents of the lugs 19, may be located around the rim of the wheel and operatively connected to the make-and-break switch. Any one of the series of such hand-operated devices will operate the switch, regardless of the position to which the steering wheel may be turned and without materially changing the grip of the driver's hands on the steering wheel.

Having thus described my invention, what I claim and desire to secure by Letters Patent is:

1. In a motor vehicle, a steering wheel, a make-and-break switch, a switch-operating mechanism comprising a switch operating lever, a plurality of longitudinally movable, radially disposed bars carried by the arms of said steering wheel, the inner ends of said bars formed to comprise together an expansible ring surrounding the hub of said steering wheel and said switch-operating lever, a spider capable of limited rotation on said wheel, arms on said spider, lugs on the outer ends of said arms, and means operatively connecting the arms of said spider with the respective longitudinally movable bars, whereby limited rotary movement of any spider arm produces simultaneous advancement or retraction of all of said longitudinally movable bars to actuate said switch-operating lever regardless of the rotated position of the steering wheel.

2. The combination of a steering wheel, a make-and-break switch, an angularly movable spider on said steering wheel, said spider carrying a plurality of independently movable arms capable of longitudinal movement, said arms slidable on the respective spokes of said wheel and carrying switch-actuating devices at their inner ends.

3. In combination, a steering wheel, a make-and-break switch, an actuating lever on said switch, a spider having a plurality of angularly movable radial arms, one of said arms located upon each of the spokes of said steering wheel, lugs on the outer ends of said angularly movable arms, said lugs located in proximity to the rim of the steering wheel, a longitudinally movable bar operatively connected to each arm and slidingly engaging a spoke of said wheel and means operatively connecting each of said longitudinally movable bars with said switch-actuating lever.

4. In combination, a steering wheel, a make-and-break switch, an actuating lever for said switch located in proximity to the hub of said wheel, a spider having a plurality of angularly movable hand-actuated devices spaced apart around said wheel rim, a plurality of longitudinally movable shuttle bars each carried by an arm of said spider and slidable on a spoke of said wheel, the inner end of said shuttle bar concaved, means on said spider whereby all of said shuttle bars are simultaneously moved toward and from the center of the wheel by an angular movement of said spider to cause their said concave inner ends to form a contracting or expanding ring adapted to operate said switch-actuating lever.

In testimony whereof, I affix my signature.

BLISS B. WELLS.